US006752887B2

(12) United States Patent
Runge et al.

(10) Patent No.: US 6,752,887 B2
(45) Date of Patent: Jun. 22, 2004

(54) METHOD AND APPARATUS FOR TRANSVERSALLY GLUING VENEER STRIPS

(75) Inventors: Carsten Runge, Bad Essen (DE); Michael von Mutius, Rietberg (DE)

(73) Assignee: Heinrich Kuper GmbH & Co. KG, Rietberg (DE)

( * ) Notice: Subject to any disclaimer, the term of this patent is extended or adjusted under 35 U.S.C. 154(b) by 153 days.

(21) Appl. No.: 09/959,712

(22) PCT Filed: Feb. 21, 2001

(86) PCT No.: PCT/EP01/01980

§ 371 (c)(1), (2), (4) Date: Jan. 11, 2002

(87) PCT Pub. No.: WO01/66321

PCT Pub. Date: Sep. 13, 2001

(65) Prior Publication Data

US 2002/0157757 A1 Oct. 31, 2002

(30) Foreign Application Priority Data

Mar. 8, 2000 (DE) ........................................ 100 11 207

(51) Int. Cl.$^{7}$ ................................................ B32B 31/20

(52) U.S. Cl. ......................... 156/64; 156/217; 156/351; 156/358; 156/360; 156/362; 156/477.1

(58) Field of Search ................................ 156/556, 559, 156/583.91, 558, 64, 196, 217, 304.6, 304.7, 351, 358, 369, 362, 378, 379, 475, 477.1

(56) References Cited

U.S. PATENT DOCUMENTS

| | | | |
|---|---|---|---|
| 4,042,440 | A | 8/1977 | Hasegawa et al. |
| 4,350,276 | A | 9/1982 | Kreder et al. |
| 4,838,975 | A | 6/1989 | Bernath |
| 4,841,907 | A | 6/1989 | Otsuka |

FOREIGN PATENT DOCUMENTS

| | | | |
|---|---|---|---|
| DE | 1528153 | | 3/1971 |
| DE | 3809432 | A1 | 12/1988 |
| DE | 8907631 | U1 | 11/1989 |
| DE | 19732423 | C1 | 3/1999 |
| EP | 0199841 | A1 | 11/1986 |
| JP | 2000033604 | A | 2/2000 |
| WO | WO 8201847 | A1 | 6/1982 |

*Primary Examiner*—Richard Crispino
*Assistant Examiner*—George R. Koch, III
(74) *Attorney, Agent, or Firm*—Shijyu Global IP Counselors, LLP.

(57) ABSTRACT

A method and an apparatus is provided for the transverse gluing of veneer strips to obtain a butt-glued veneer carpet. A first sensor unit and a second sensor unit are provided for aligning a front edge and a rear edge, respectively, of a veneer strip and the veneer carpet, respectively, by use of a plurality of transportation belts, respectively, in such a manner that the edge is exactly positioned within a center line of a heating zone.

19 Claims, 16 Drawing Sheets

METHOD AND APPARATUS FOR TRANSVERSALLY GLUING VENEER STRIPS

This application is the national phase application under 35 U.S.C. §371 of prior PCT International Application No. PCT/EP01/01980, which was published on Sep. 13, 2001 in the German language.

FIELD OF THE INVENTION

The present invention relates to a method and an apparatus for transversely gluing veneer strips to obtain a butt-glued veneer carpet.

BACKGROUND OF THE INVENTION

It is known from the prior art that veneer strips are glued on their butt edges to produce a large veneer carpet.

To this end so-called transverse assembly machines for the butt gluing of wooden veneers are known from the prior art. In these machines, pre-glued veneer strips are transferred into a heating zone and are there glued together on their edges under the action of pressure and heat. It goes without saying that the joining areas of the veneer strips must each be oriented such that they are positioned in the heating zone.

An exact alignment of the rear edge of the respectively preceding veneer strip is achieved in the known apparatuses in that the veneer strip is transported beyond the heating zone and then subjected to a reversing counter-movement. Prior to the beginning of this counter-movement, stop pins against which the veneer strip is mechanically placed are extended in the area of the heating zone. The respectively next veneer strip to be glued is supplied in the meantime and also oriented relative to stop pins. Subsequently, the further veneer strip is moved against the stop pins still positioned in the heating zone and is thus aligned accordingly. For gluing the two veneer strips the heating zone is then closed, the stop pins are retracted. The preceding veneer strip is retained while the new additional veneer strip is pushed against the edge of the preceding veneer strip and held under tension until the joining process has been completed.

A drawback of this method is on the one hand that a lot of time is needed because of the reversing movement of the preceding strip. Furthermore, in the case of corrugated or warped veneer strips there is the risk that these are not exactly placed against the stop pins. Thus the veneer strips would not lie in planar fashion in front of the pins, but would have folds and other deformations. This also applies to the new veneer strip which is pushed against the edge of the preceding veneer strip after removal of the stop pins. There is again the risk that this displacement operation is not carried out exactly.

A similar method in which a veneer strip is aligned by means of pendulum type stops and first-sheet stops are described in Utility Model 93 01 196.2. The stops used in this case have the above-described drawbacks.

It is a further known from the prior art to pass on the resulting veneer carpet by one veneer strip width each after the joining operation and to fix it. There is the risk that tolerances in the veneer strip widths and the transportation mechanism add up with an increasing number of joints to such a degree that the edge of the veneer strip to be glued is no longer positioned in the area of the heating zone.

SUMMARY OF THE INVENTION

It is object of the present invention to provide a method and an apparatus of the above-mentioned type which permit a substantially automatic butt type gluing of veneer strips while being of a simple design and easily usable in an operationally reliable manner.

According to the invention this object is achieved by the two independent claims; the corresponding subclaims show further advantageous developments of the invention.

As far as the method is concerned, it is thus intended according to the invention that a first veneer strip is first transported or supplied, that the passage of the rear edge of the veneer strip is determined by means of a first sensor unit, that in response to the values determined by the first sensor unit, the transportation path needed up to a desired position of the rear edge of the veneer strip in the area of the heating zone is calculated, and that at least one transportation means is controlled or adjusted on the basis of the values determined.

The method according to the invention is characterized by a number of considerable advantages. First of all, it is possible according to the invention to entirely dispense with mechanical stop means, at least in the area of the heating zone. Thus, this fully excludes the risk that the edge of a veneer strip is not adequately or correctly placed against stop means. In addition, the mechanical construction of the apparatus is simplified because the mechanical stops means and their drive and control can be entirely dispensed with.

Thanks to the possibility provided according to the invention for controlling at least one transportation means, i.e. in the presence of several transportation means these means are controlled independently of each other, it is possible to align the veneer strip very exactly also in cases where the strip has an obliquely positioned edge or where the veneer strip is distorted or warped. Hence, according to the invention it is possible to position a veneer strip exactly and optionally to straighten the same and to simultaneously align the strip in parallel with the heating zone and to position the same therein. A reversing movement can here be dispensed with.

Hence, the method according to the invention can be employed for aligning the rear edge of a first veneer strip and also the respective front edges of the subsequent veneer strips. It is thus possible to carry out an optimized and perfect joining operation, independent of the number of veneer strips and of slight dimensional deviations.

In a particularly advantageous development of the invention, the position of the edge of the veneer strip is determined in a direction transverse to the direction of transportation by means of the first sensor means at a plurality of measuring points. Depending on the precision desired for the gluing operation, a sufficiently great number of measuring points can be used.

To ensure an exact alignment of edges of veneer strips that are not positioned at an exactly right angle relative to the transportation direction, it is particularly advantageous when the transportation takes place via several transportation means which are arranged side by side in the direction of transportation.

To avoid errors that might occur after passage through the first sensor unit, it is particularly advantageous to determine the position of the edge of the veneer strip by means of a second sensor unit in the area of the heating zone and to correct the position of the veneer strip, if necessary. It is thus possible to check once again within the heating zone whether the edge of the veneer strip is exactly positioned and to perform a correction, if necessary.

To achieve a uniform configuration of the veneer carpet for ensuring a high-quality precise joining operation, it is of particular advantage when the edge of the veneer strip is positioned in parallel with the heating zone arranged at a right angle relative to the direction of transportation. Thus, the joining area is always in optimum alignment with the heating zone.

In particular in the case of long or large veneer strips, there is the risk that these are warped or distorted. To compensate for such flaws, it is intended according to the invention that a distortion of the veneer strip is determined by means of the first and/or second sensor unit and that the plurality of transportation means are operated separately for a straight alignment of the veneer strip. It may here be of particular advantage when individual portions of the veneer strip are clamped for a straight alignment thereof. Other portions may be moved on by means of the transportation means, resulting in a straight joining edge.

It is of particular advantage when the veneer strip is reversingly movable in the direction of transportation behind the heating zone. For instance, it is in particular possible in the case of a first veneer strip to align the same in an optimum way in the heating zone after passage of its rear edge.

As far as the apparatus is concerned, the object underlying the invention is achieved by the following features: a first group of transportation means for supplying veneer strips, a first sensor unit in the area of the first group of transportation means, a heating zone arranged in a direction transverse to the direction of transportation, a second sensor unit in the area of the heating zone, a second group of transportation means arranged downstream of the heating zone, and a control and/or adjustment unit.

The apparatus according to the invention is also characterized by a number of considerable advantages. First of all, the whole structure of the apparatus is relatively simple because the stop elements, which are retractable into the plane of the veneer strips according to the prior art, can be entirely dispensed with. A soiling of or damage to the stop elements and the drives thereof is thus no longer possible. The manufacture of the apparatus is thereby simplified. In addition, the maintenance work is considerably reduced.

To be able to align the individual veneer strips in an exactly straight orientation relative to the heating zone and to be able to perform rotational movements as well, it is of particular advantage when the first group of transportation means comprises a plurality of separately operable transportation belts which are arranged side by side in the direction of transportation. This applies to the second group of transportation means as well.

The first and/or second group or transportation means has preferably assigned thereto counter-pressure means for contacting the surface of the veneer strips. It is possible with the help of these counter-pressure means to clamp the veneer strips in individual areas for compensating for distortions. The counter-pressure means preferably comprise bail elements which only effect a clamping at points and thus permit a rotation of the veneer strip.

According to the invention the first and second sensor units preferably comprise optical sensors. It is of particular advantage when several optical sensors are arranged in a row in a direction transverse to the direction of transportation. In an advantageous embodiment of the invention, the optical sensors thus form vertical light barriers. The passage of a front edge or a rear edge of a veneer strip can thus be detected and recorded very accurately. Since several light barriers of such a type are provided in a direction transverse to the direction of transportation, it is possible in a particularly reliable manner to detect the veneer strip exactly with respect to its original position and then to align the same.

The first and/or second group of transportation means is designed in a particularly advantageous manner such that it is operable both in the direction of transportation and also opposite to said direction of transportation.

The heating zone advantageously comprises upper and lower pressure elements to hold the veneer strips exactly during the joining operation.

BRIEF DESCRIPTION OF THE DRAWINGS

The invention shall now be described in the following with reference to embodiments taken in conjunction with the drawing, in which.

DETAILED DESCRIPTION OF THE INVENTION

Figure 1:
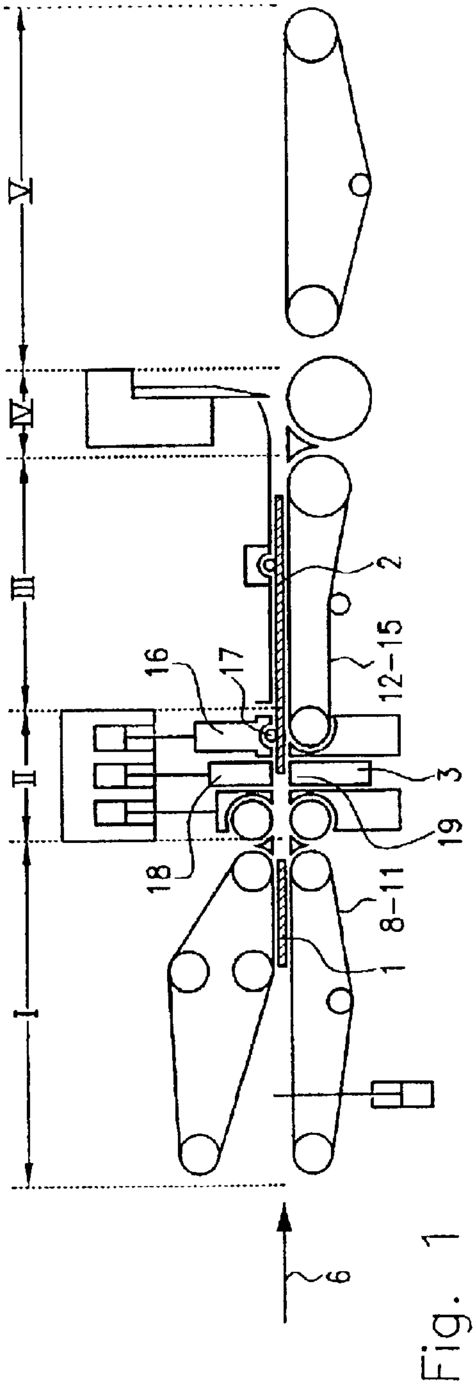
FIG. 1 is a schematic side view of an embodiment of the apparatus according to the invention.

FIG. 1 is a simplified schematic side view showing an embodiment of the apparatus according to the invention. The apparatus is divided into a transportation area I for supplying individual veneer strips to be glued by means of conveying or transportation belts, a joining area II with a heating zone 3, a transportation area III with transportation belts for aligning the veneer carpet, a cutting area IV and a discharge area V for discharging the cut veneer sheets for passing them over to storing or stacking means.

In FIG. 1, an arrow 6 illustrates the direction of transportation. The Figure is a strongly simplified view showing a veneer strip 1 which is supplied by transportation belts 8 to 11 to a first group of transportation means. For a better representation the respective transportation means are shown in an open state. Reference sign 2 designates a veneer carpet which consists of a plurality of glued veneer strips.

As can be seen in the area of the joining portion II, the heating zone 3 consists of an upper pressure element 18 and a lower pressure element 19. Lower transportation belts 12 to 15 of a second group of transportation means are shown downstream of the heating zone 3. Counter-pressure means

16 with ball elements 17 are positioned above the transportation belts 12 to 15.

Figure 2:
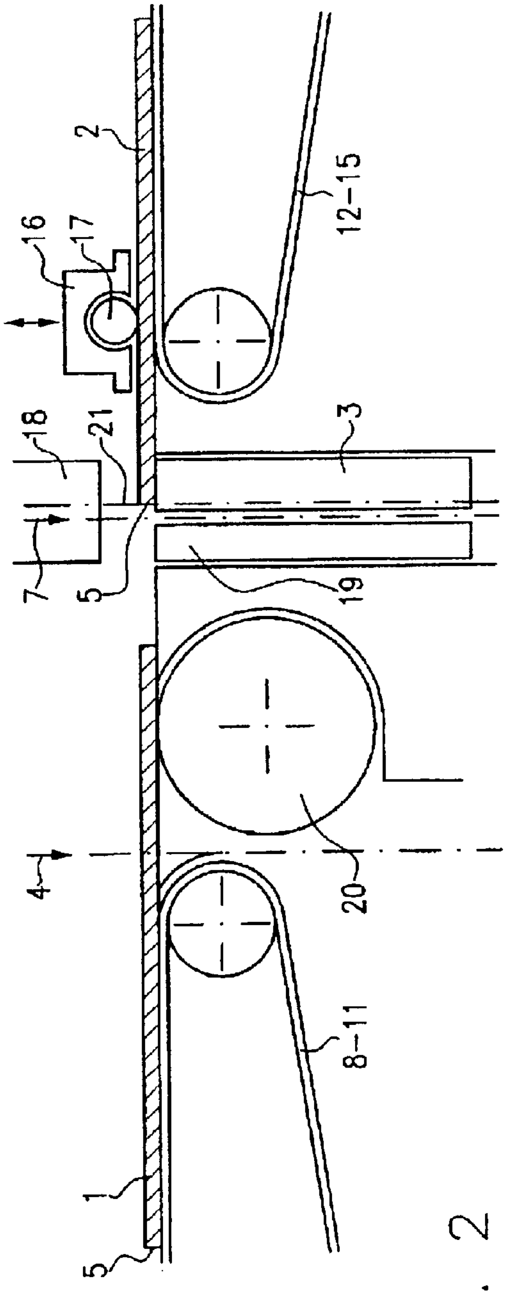
FIG. 2 is an enlarged detail view of the heating zone area of the apparatus according to the invention.

The joining area is shown on an enlarged scale in FIG. 2. As can in particular be seen, the transportation belts 8 to 11 have arranged downstream thereof at least one friction shaft 20 which moves the respective veneer strips into the heating zone 3.

FIG. 2 schematically shows a first sensor unit 4. The illustration shows, in particular, the vertical light barrier which is formed by the first sensor unit 4.

Reference numeral 7 designates a second sensor unit which is positioned in the area of the heating zone 3. The distance between the two sensor units 4 and 7 is e.g. 60 mm.

Drawn behind the second sensor unit 7 in the direction of transportation is a line 21 which forms the ideal position for a rear edge 5 of a preceding veneer strip 1.

As can further be seen in FIG. 2, counter-pressure means 16 with ball elements 17 that are vertically adjustable are arranged above the transportation belts 12 to 15 of the second group of transportation means.

Thus, the first and second sensor units 4, 7 form a number of light sensors or other detection elements which sense the position and parallelism of the veneer strips 1 as well as the curvature of a first veneer strip. The values of the sensor units are stored and used by means of a control and adjustment unit employing controlled intelligent transportation means for exactly aligning the veneer strips and, in particular, for correcting distortions of a first veneer strip.

In the method according to the invention and in the apparatus to be used according to the invention, the transportation speed of a veneer strip is sensed and adjusted accordingly. Hence, passage through the first sensor unit results in a predetermined transportation path and a predetermined transportation time, respectively, until a desired optimum position is reached in the area of the heating zone 3, e.g. along line 21. Thus, straight veneer strips need not be corrected or aligned once again. Thanks to the exact control of the transportation means stops, or the like, for a mechanical alignment can entirely be dispensed with.

Figure 3:
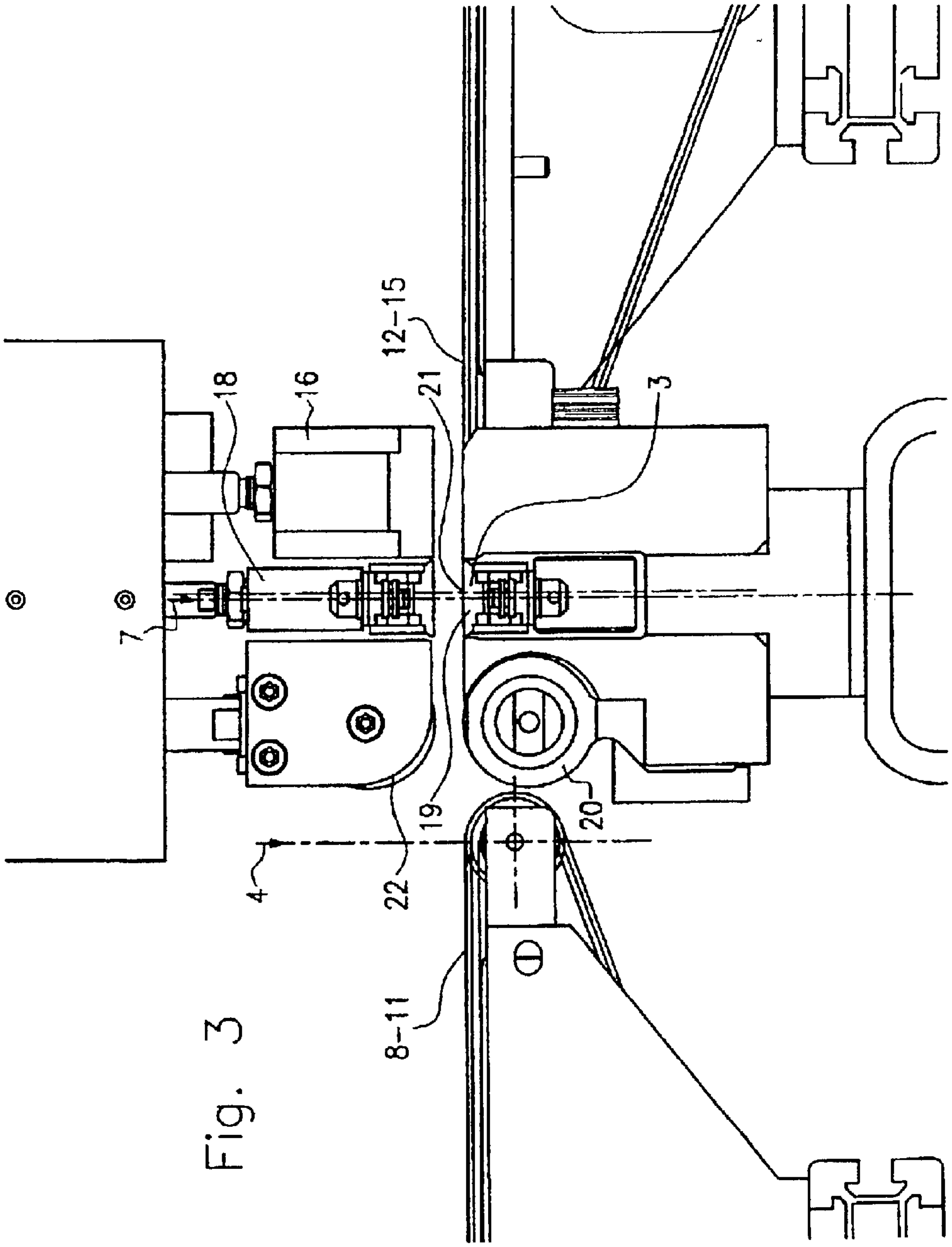
FIG. 3 is a view, similar to FIG. 2, of a further embodiment of the invention.
Figure 4:
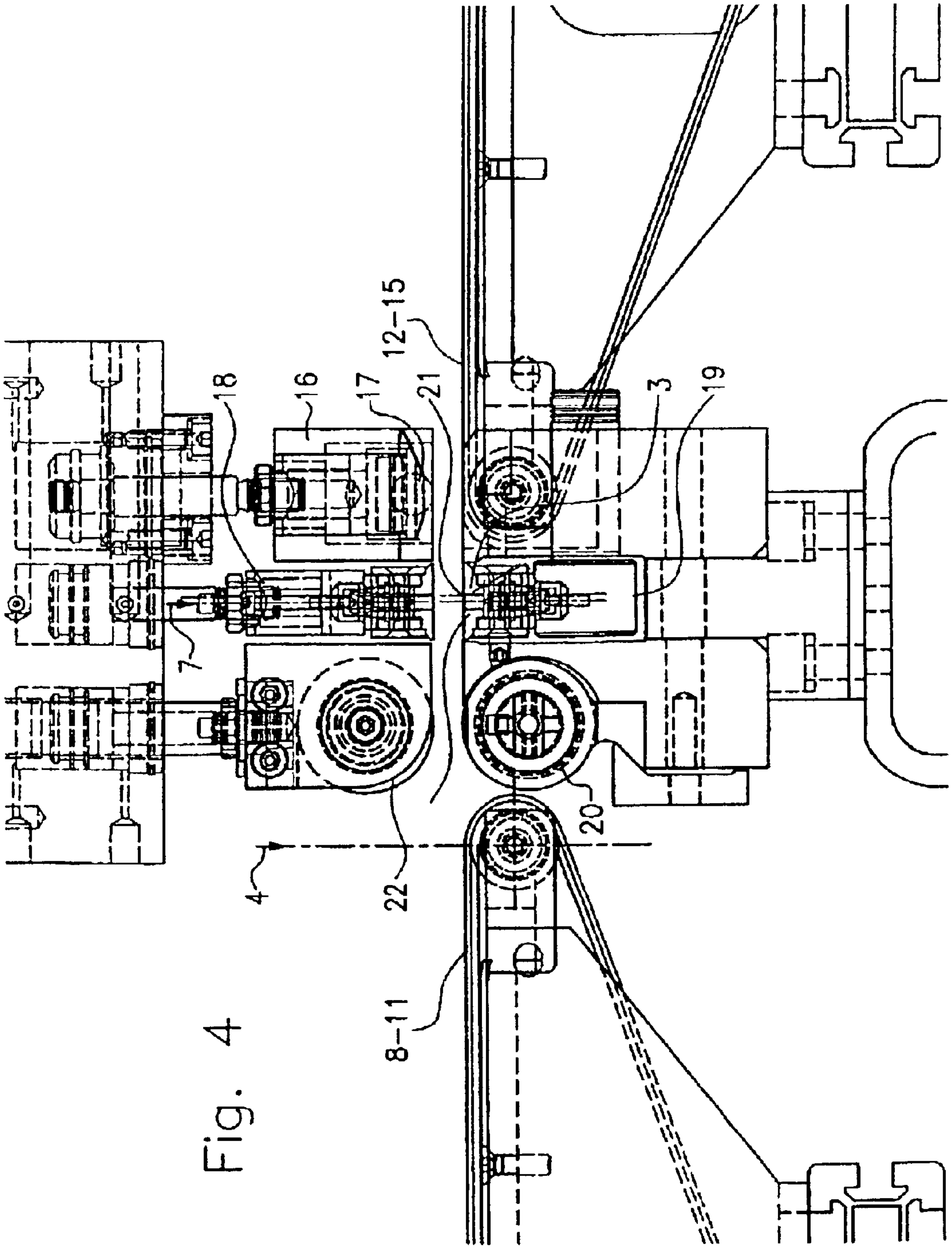
FIG. 4 is a view, by analogy with FIG. 3, in a detailed representation.

FIGS. 3 and 4 are each analogous illustrations showing an embodiment similar to FIG. 2. In these figures, the individual technical components have been outlined for the purpose of illustration. As can be seen in particular, the position of the first sensor means 4 can be varied, depending on the constructional conditions of the apparatus.

Figure 6:
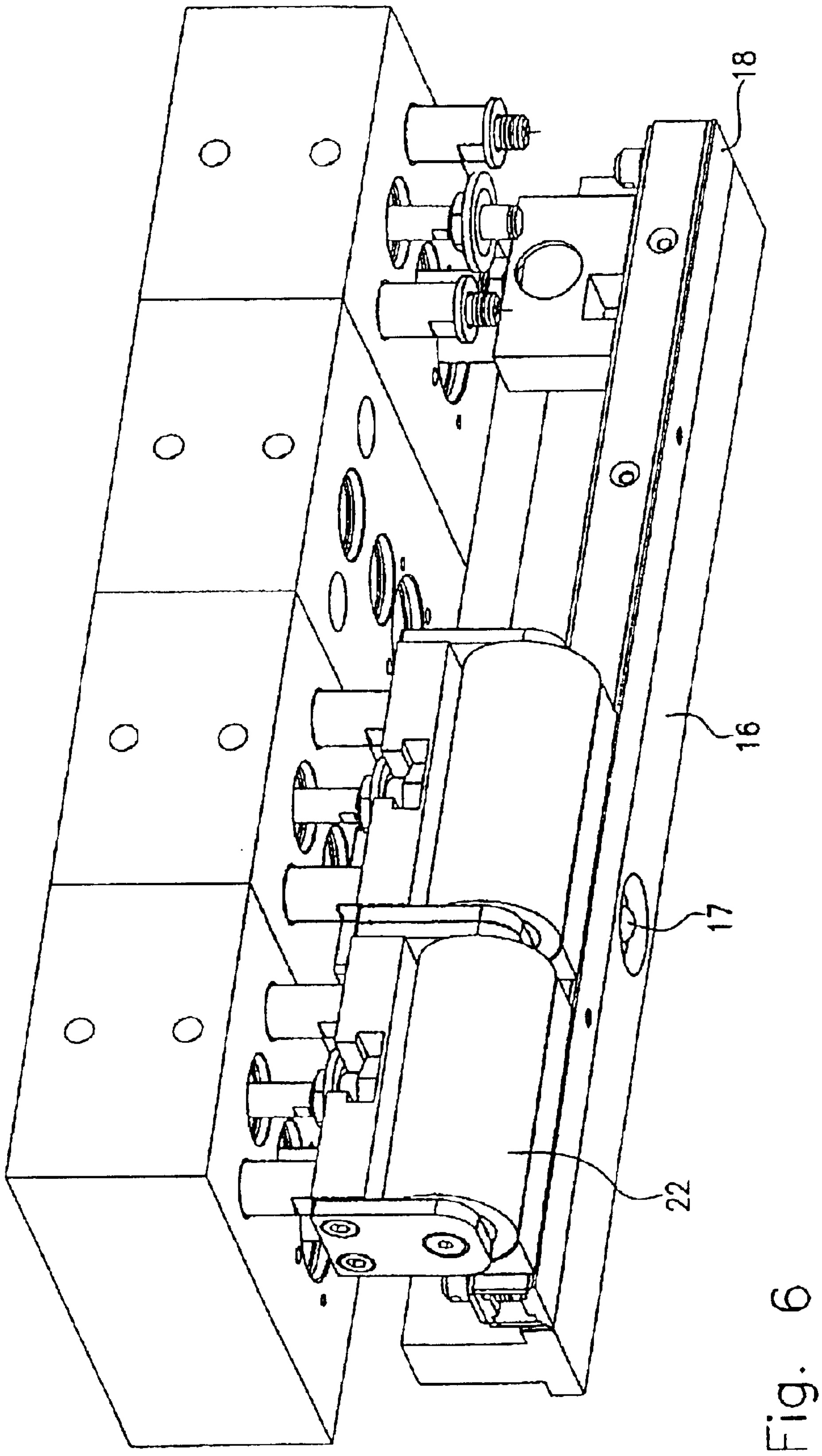
FIG. 6 is a perspective partial view of an upper portion of the heating zone and the associated elements.
Figure 7:
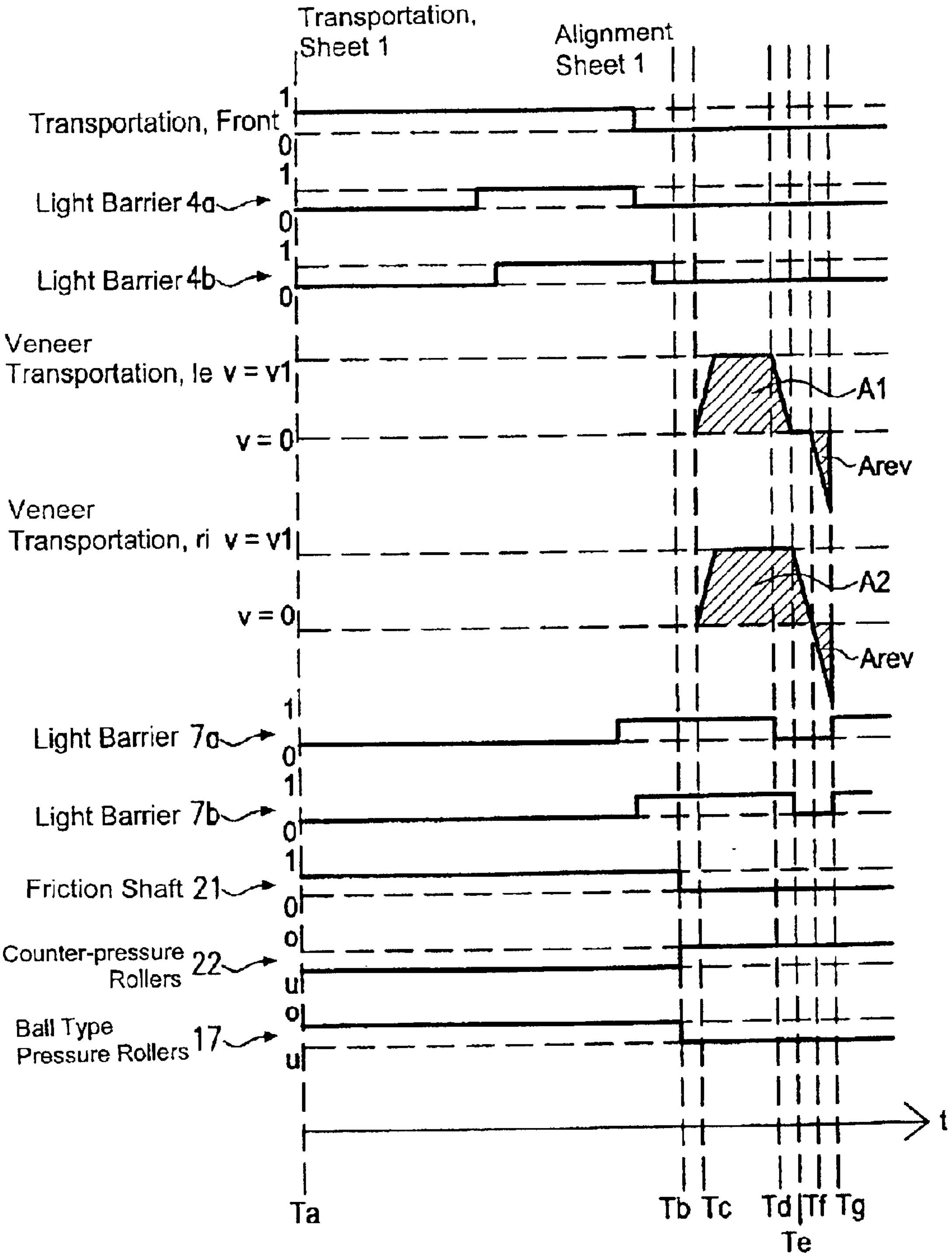
FIG. 7 is a time diagram showing the sequence of the alignment of a first veneer strip in parallel with the heating zone.

A pressure shaft 2 is arranged above the friction shaft 20. The pressure shaft serves the exact transportation of the veneer strips. It follows, in particular, from the illustration of FIG. 6 that a plurality of such pressure shafts 22 are provided in a modular way to ensure a targeted supply of the veneer strips.

The heating means with the upper pressure element 18 and the lower pressure element 19 is known from the prior art so that further explanations are not needed. However, it should be noted that the second sensor unit 7 is arranged in the area of the heating zone. To this end the heating zone comprises a plurality of vertical recesses.

Figure 5:
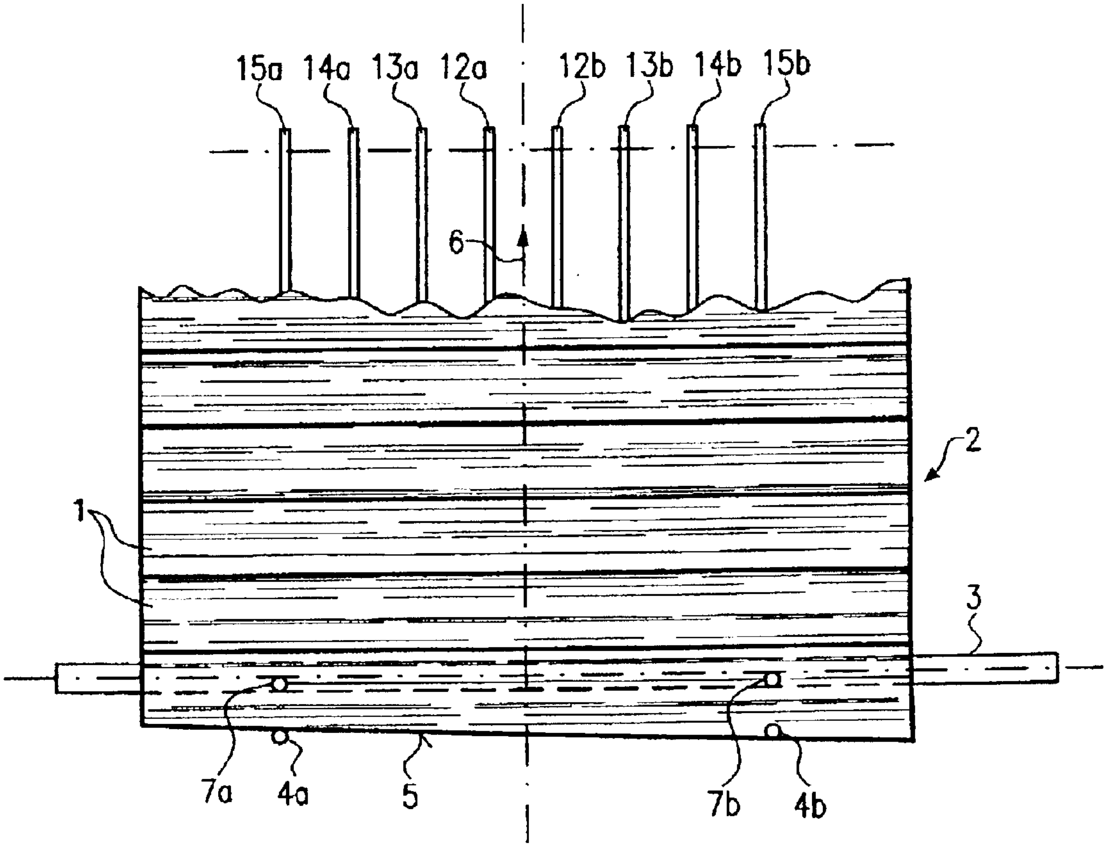
FIG. 5 is a schematic simplified top view on a portion of the apparatus according to the invention.

FIG. 5 is a top view on an inventive veneer carpet 2 which has been manufactured from a plurality of individual veneer strips 1. A rear edge 5 of a last processed veneer strip is just arranged in the area of the first sensor unit 4 (illustrated are two light barriers 4*a* and 4*b*). FIG. 5 shows that the rear edge 5 of the veneer strip is oriented in oblique direction. 7*a* and 7*b* designate two light barriers of the second sensor unit 7 in the area of the heating zone 3. As is further shown, the second group of transportation means comprises a total of eight transportation belts (12*a* to 15*a* and 12*b* to 15*b*) in this embodiment. It is thus possible by way of a different control of these individual transportation belts to align the rear edge 5 of the veneer carpet 2 in the area of the second sensor unit 7 and thus of the heating zone 3 exactly at a right angle relative to the transportation direction 6.

In detail, this aligning operation is as follows. It shall be assumed that the last illustrated veneer strip 1 has just been glued to the veneer carpet 2. The transportation belts 12 to 15 of the second group of transportation means thus transport the veneer carper 2 in the direction of transportation 6. To this end all of the transportation belts are operated synchronously. However, during passage through the first sensor unit 4 it is determined that the rear edge of the veneer strip 1 is oriented at an undesired angle. The values of the rear edge 5 passing through the first sensor unit 4 are stored in the adjustment or control unit. With the help of the parallel-recorded transportation path, the distance to be still covered by the veneer strip 1 is thus calculated. In the further course, the transportation belts are now controlled or adjusted at both sides of the centerline such that the distance to be still covered up to the center of the heating zone 3 is covered by a predetermined time. Since the rear edge 5 is not aligned in parallel with the centerline of the heating means, a correcting operation is now performed by calculating and carrying out two different path/time functions of the transportation means. A particularly advantageous embodiment of the invention provides for a construction where the individual transportation belts 12 to 15 are each driven by a servomotor of their own. To ensure a corresponding frictional connection between the veneer carpet 2 and the transportation belts 12 to 15, a force is exerted from above by means of the ball elements 17 on the veneer carpet 2 to press said carpet against the transportation belts 12 to 15. With the help of the ball elements 17, however, it is possible to rotate the veneer carper to achieve the desired parallelism of the rear edge 5 relative to the centerline of the heating zone 3. The calculated time/path functions are produced by the servomotors of the transportation belts and transmitted via the transportation belts to the veneer carpet 2. It should be noted that instead of ball elements it is also possible to use standard rollers, pressure rollers or ball type pressure rollers.

To exclude additional undesired effects during this transportation and to ensure that the rear edge 5 is exactly aligned with the heating zone 3, the second sensor unit 7 is provided. This unit is arranged shortly in front of the centerline of the heating zone 3 and measures the passage of the rear edge 5 once again. On the basis of the distance covered according to this result and of the distance of the second sensor unit 7 from the centerline of the heating zone 3, the residual deviation calculated once again. If this deviation exceeds a tolerance value to be defined, this difference is once again corrected via the transportation belts. Thus it is also possible by way of a reversing movement to transport the veneer carpet 2 back, if necessary, by the calculated difference value.

FIGS. 7 to 10 show the sequence of the alignment of a first veneer strip in parallel with the heating zone 3. At a point of time Ta, the first and second sensor units 4, 7 are free. In the illustration, the first sensor unit 4 is represented by the light barriers 4*a* and 4*b*, while the second sensor unit 7 regards the light barriers 7*a* and 7*b*.

Figure 8:
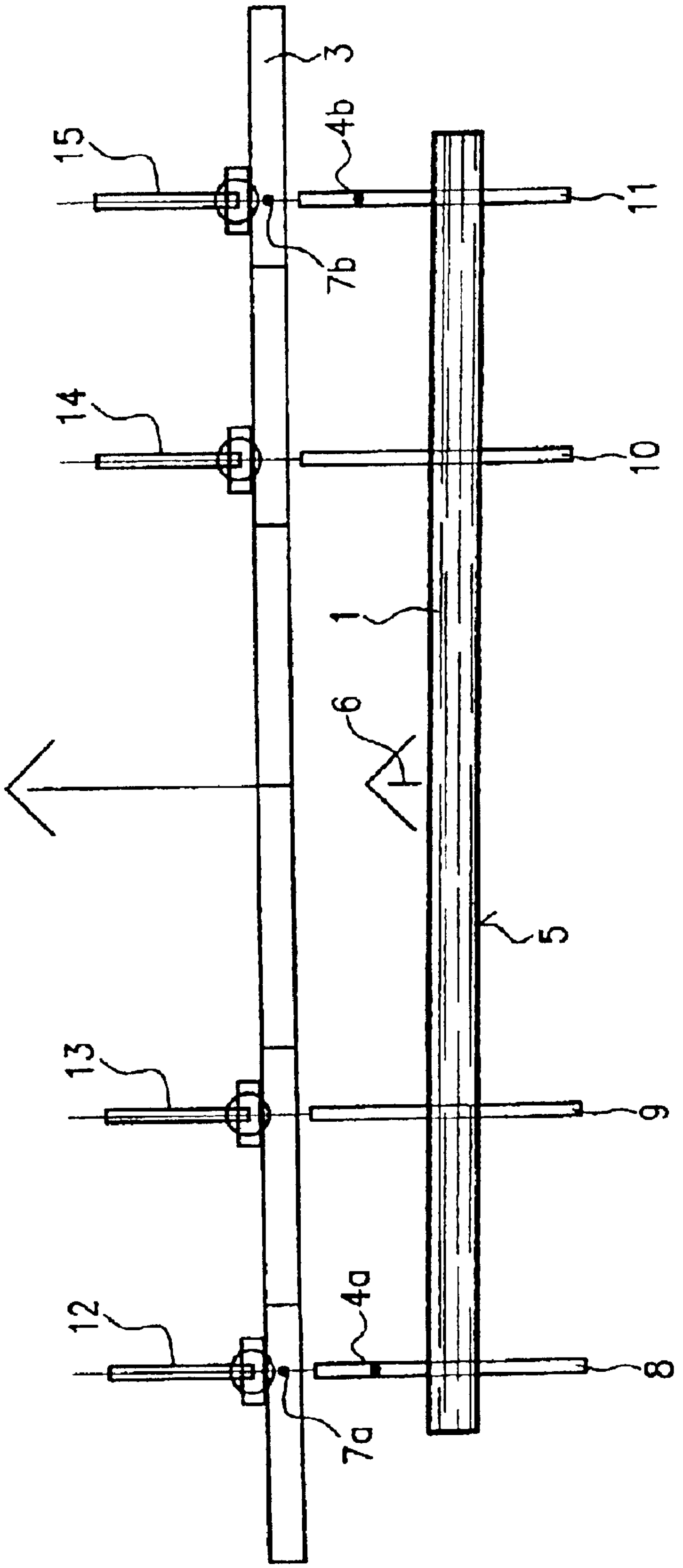
FIGS. 8 to 10 are detail views showing the alignment of the veneer strip according to the flow chart of FIG. 7.
Figure 9:
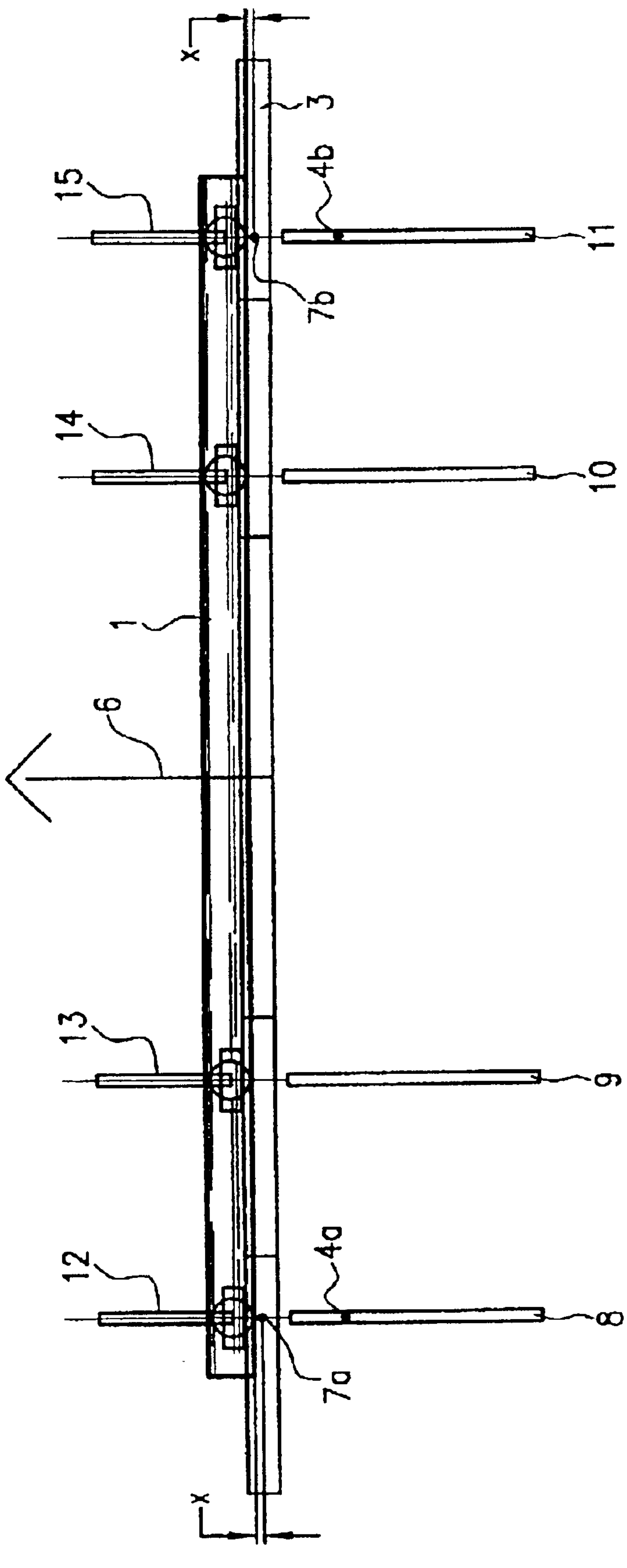
Figure 10:
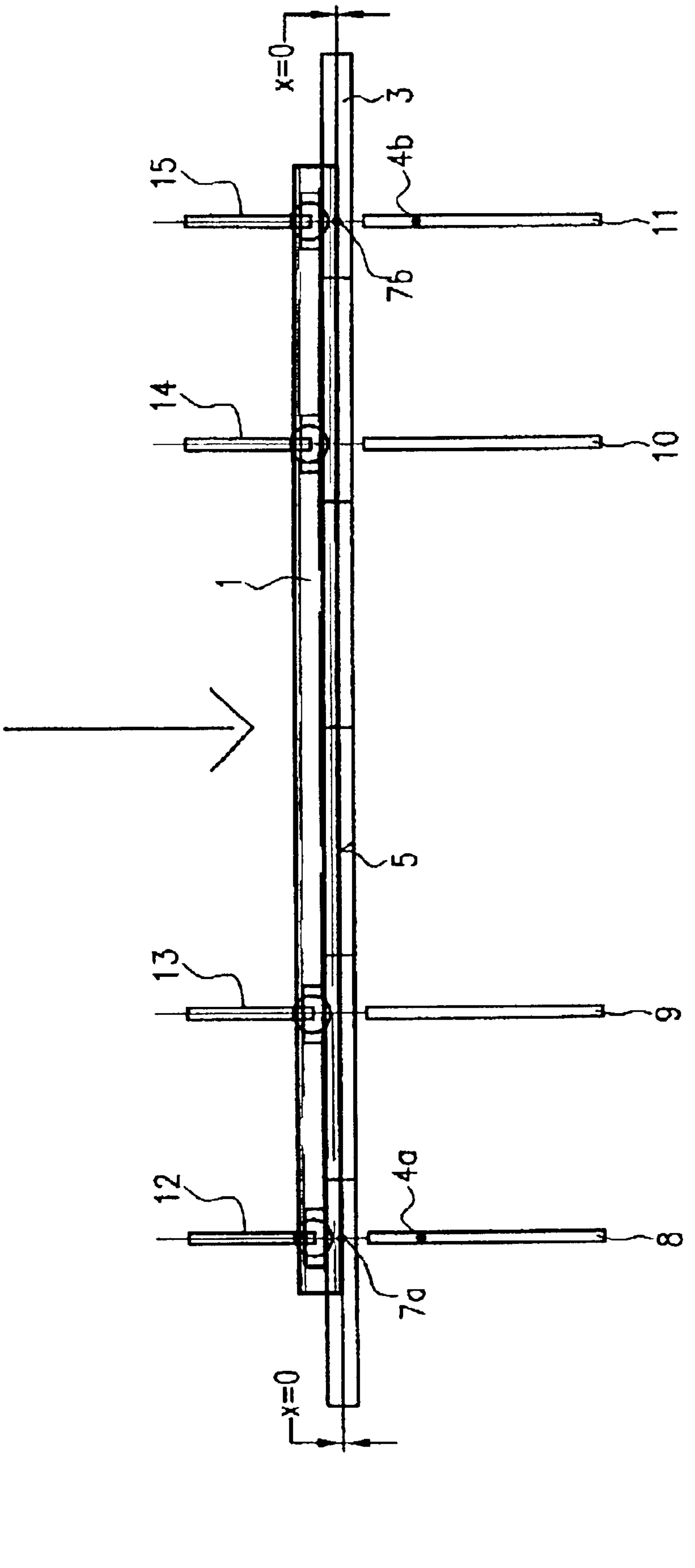

For starting the operation the light barriers 4*a*, 4*b*, 7*a*, 7*b* are free; a veneer strip 1 is supplied by the transportation belts 3 to 11 and the friction shaft 20. At a point of time Tb, the veneer is positioned in the area of the ball type pressure rollers 17. The friction shaft 21 stops, the counter-pressure roller 22 moves upwards while the ball type pressure rollers 17 are moved downwards with the help of the counter-pressure means 16. At a point of time Tc, the transportation belts 12 to 15 of the second group of transportation means are started. At a point of time Td, the light barrier 7*a* of the second sensor unit 7 detects the rear edge 5 of the veneer and stops the corresponding transportation belts of the second group of transportation means, e.g. the left transportation belts. At a point of time Te, the light barrier 7*b* of the second sensor unit 7 detects the rear edge 5 of the veneer strip 1 and stops the corresponding transportation belts of the second group of transportation means, e.g. the right transportation belts. At a point of time Tf, the rear edge 5 is positioned in parallel with the heating zone 3 by the reversing movement of the transportation belts 12 to 15. At a point of time Tg, the light barriers 7*a* and 7*b* detect the rear edge 5 of the veneer strip 1. The positioning operation is stopped. The areas A1 and A2 shown in FIG. 7 correspond to the distances covered by the respective right and left transportation belts. FIGS. 8 to 10 are top views showing the above-described operation once again. FIG. 8 illustrates time Ta. FIG. 9 shows points of time Td and Te, respectively, after the light barriers 7*a* and 7*b*, respectively, have been passed by. The transportation belts 12 and 13 are stopped while the transportation belts 14 and 15 are further operated. FIG. 10 shows a point of time Tf. The movement of the veneer strip 1 is reversed until the strip is in exact alignment, i.e. the illustrated distance X=0.

It goes without saying that the number of light barriers used can be much greater than the two illustrated light barriers for sensing the parallelism of the rear edge 5 of the veneer strip 1 at additional measuring points. This is in particular useful when the risk arises in the case of very long veneer strips 1 that these are corrugated or twisted. The quality of the straightening and positioning operation can also be enhanced by the number of transportation belts.

Figure 11:
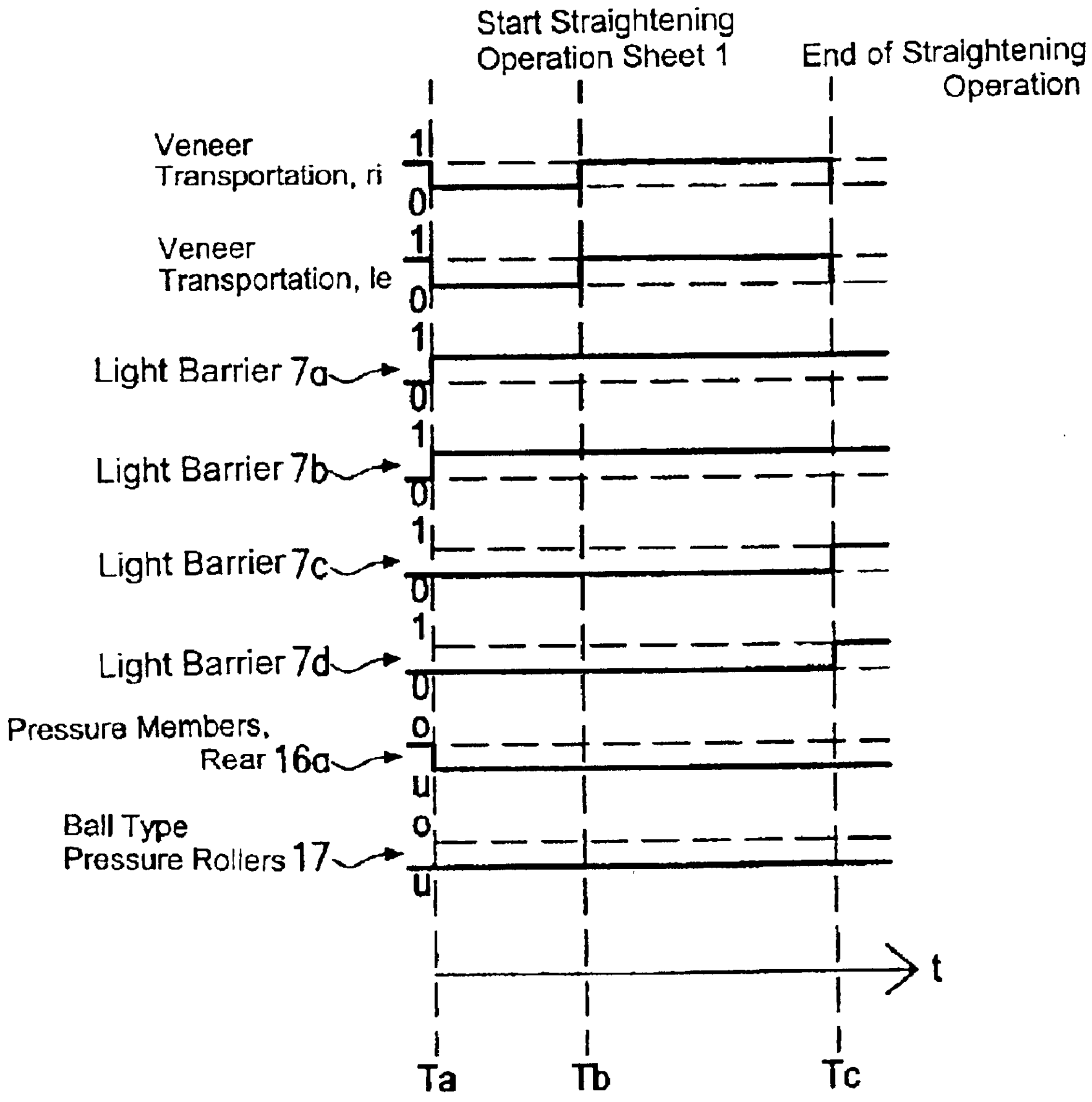
FIG. 11 is a time diagram showing the sequence of straightening the first veneer strip in parallel with the heating zone.
Figure 12:
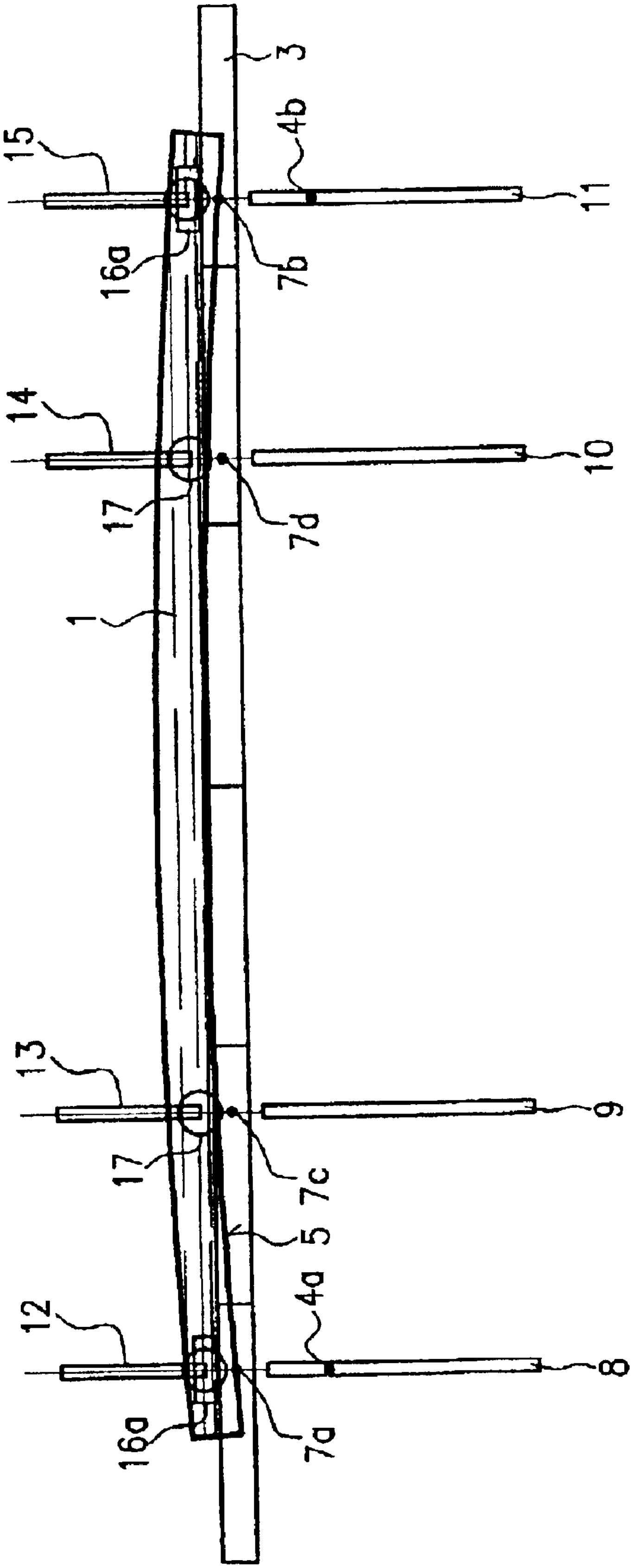
FIGS. 12 to 14 are detail views showing the sequences according to the flow chart of FIG. 11.
Figure 13:
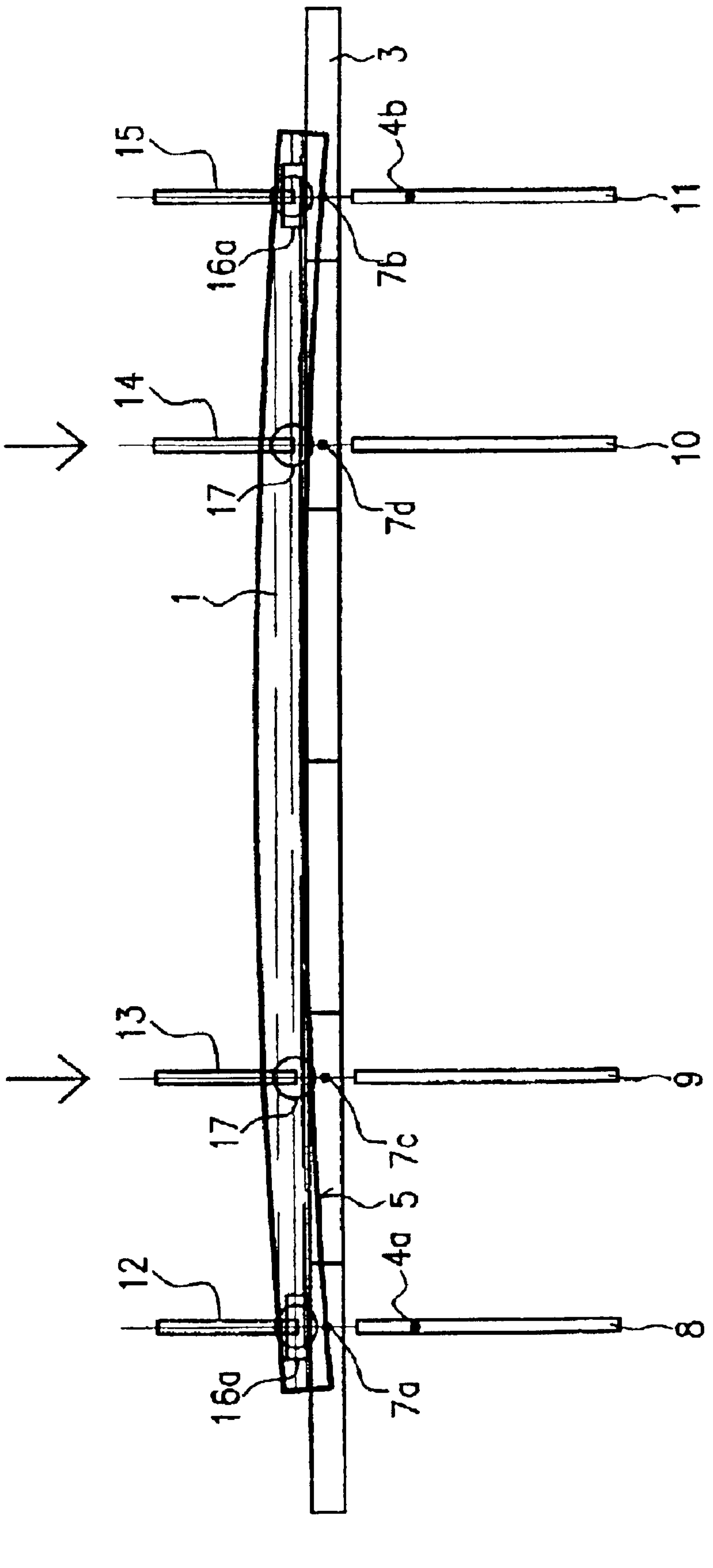
Figure 14:
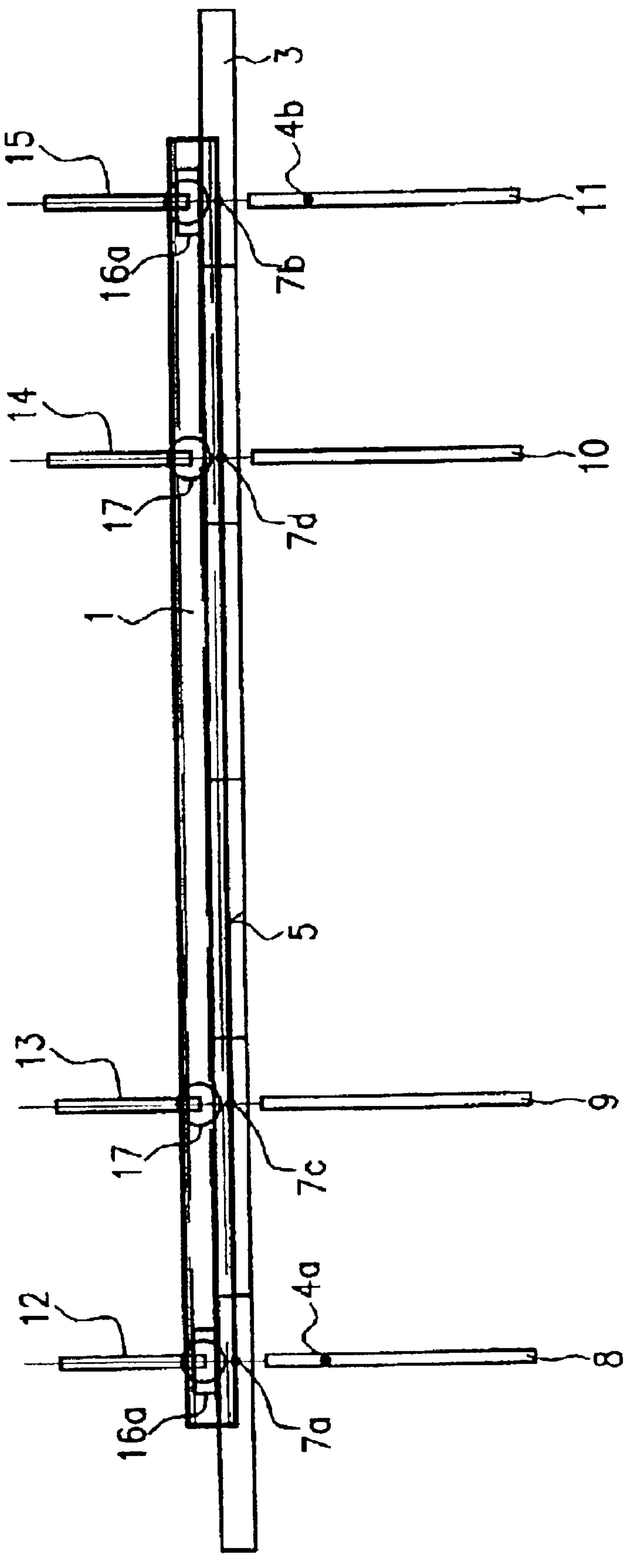

FIG. 11 shows the sequence of the straightening operation for a first veneer strip in parallel with the heating zone. FIGS. 12 to 14 show the respective sequences on an enlarged scale.

At a point of time Ta (FIG. 12), the respective portion of the rear edge 5 of the veneer strip 1 is positioned at the light barriers 7*a* and 7*b*. At a point of time Tb (FIG. 13), the re-bending of the curved veneer strip 12 is started. To this end pressure members 16*a* are pressed in the area of the light barriers 7*a* and 7*b* against the veneer strips 1 to fix said strips. In the area of the light barriers 7*c* and 7*d*, a holding operation is performed by means of the ball elements 17 which apply a corresponding frictional pressure to the transportation belts 13 and 14. The central area of the veneer strip 1 is moved towards the centerline of the heating zone 3 by a reversing movement of the transportation belts 13 and 14 (see arrows in FIG. 13). At a point of time Tc (FIG. 14), the light barriers 7*c* and 7*d* detect the rear edge 5 of the veneer strip 1. The movement of the transportation belts 13 and 14 is stopped, the veneer strip 1 is fixed and thus prepared for the subsequent joining operation.

Figure 15:
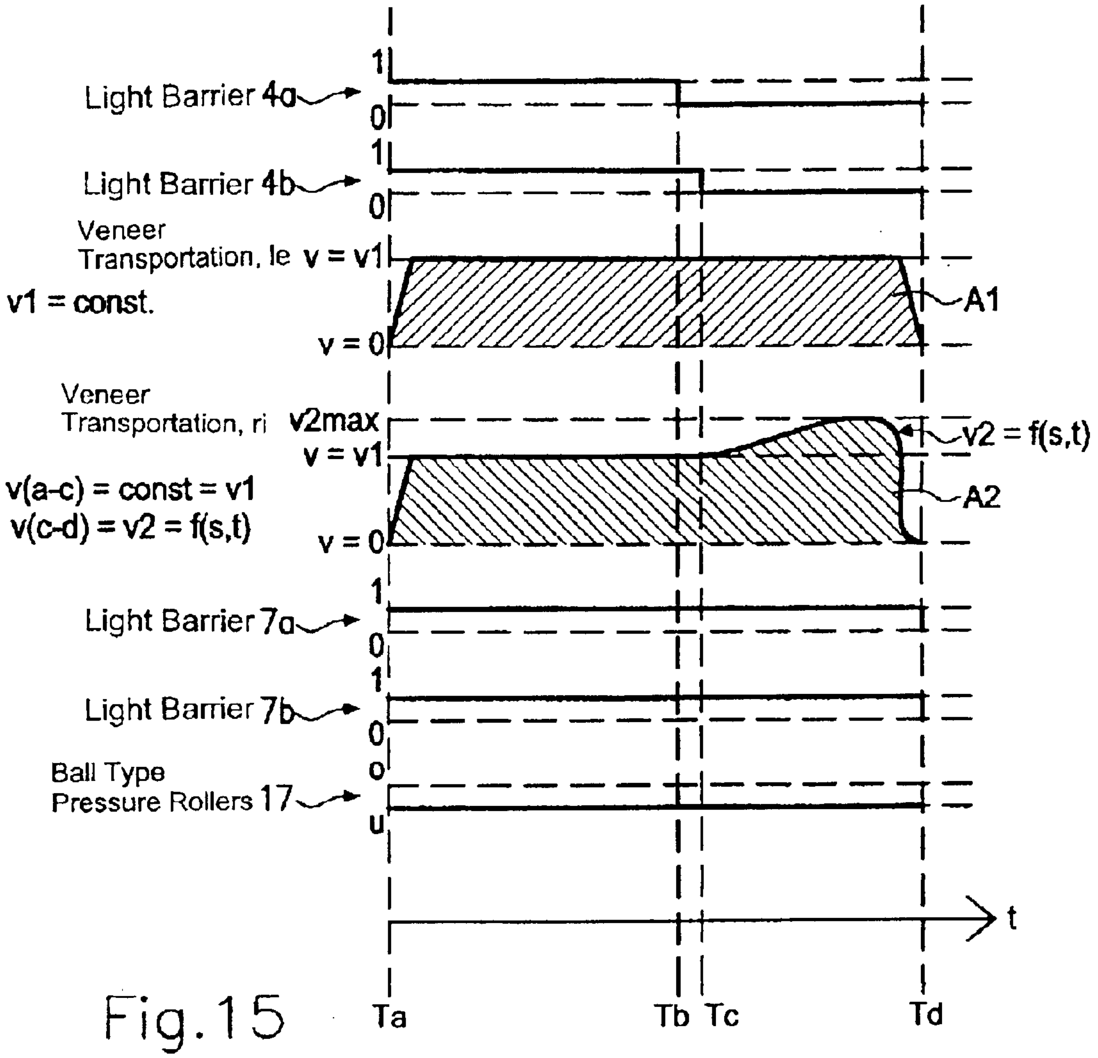
FIG. 15 is a time diagram showing the sequence of aligning a veneer carpet in parallel with the heating zone.
Figure 16:
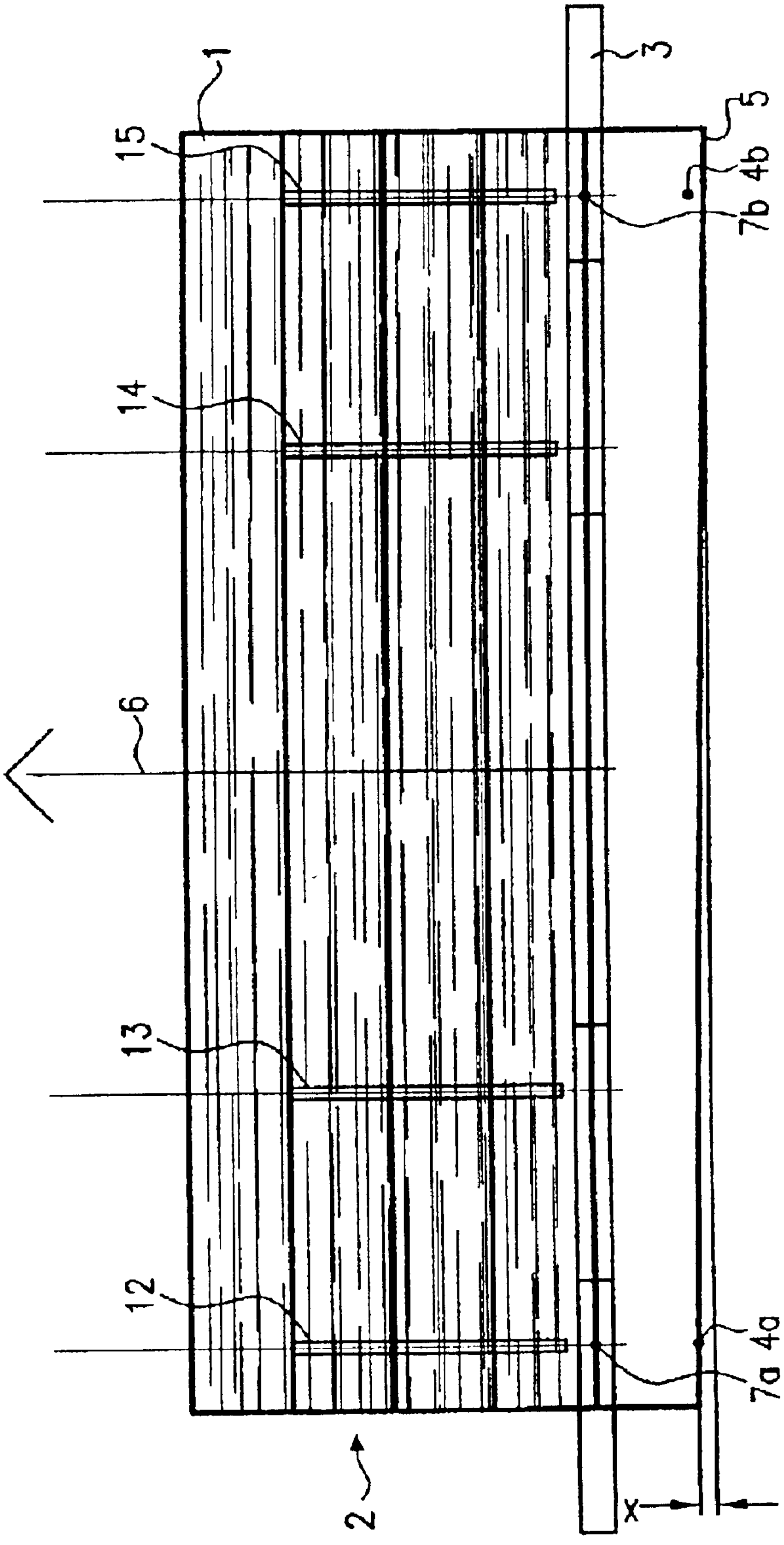
FIGS. 16 and 17 are detail views showing the sequence according to the flow chart of FIG. 15.
Figure 17:
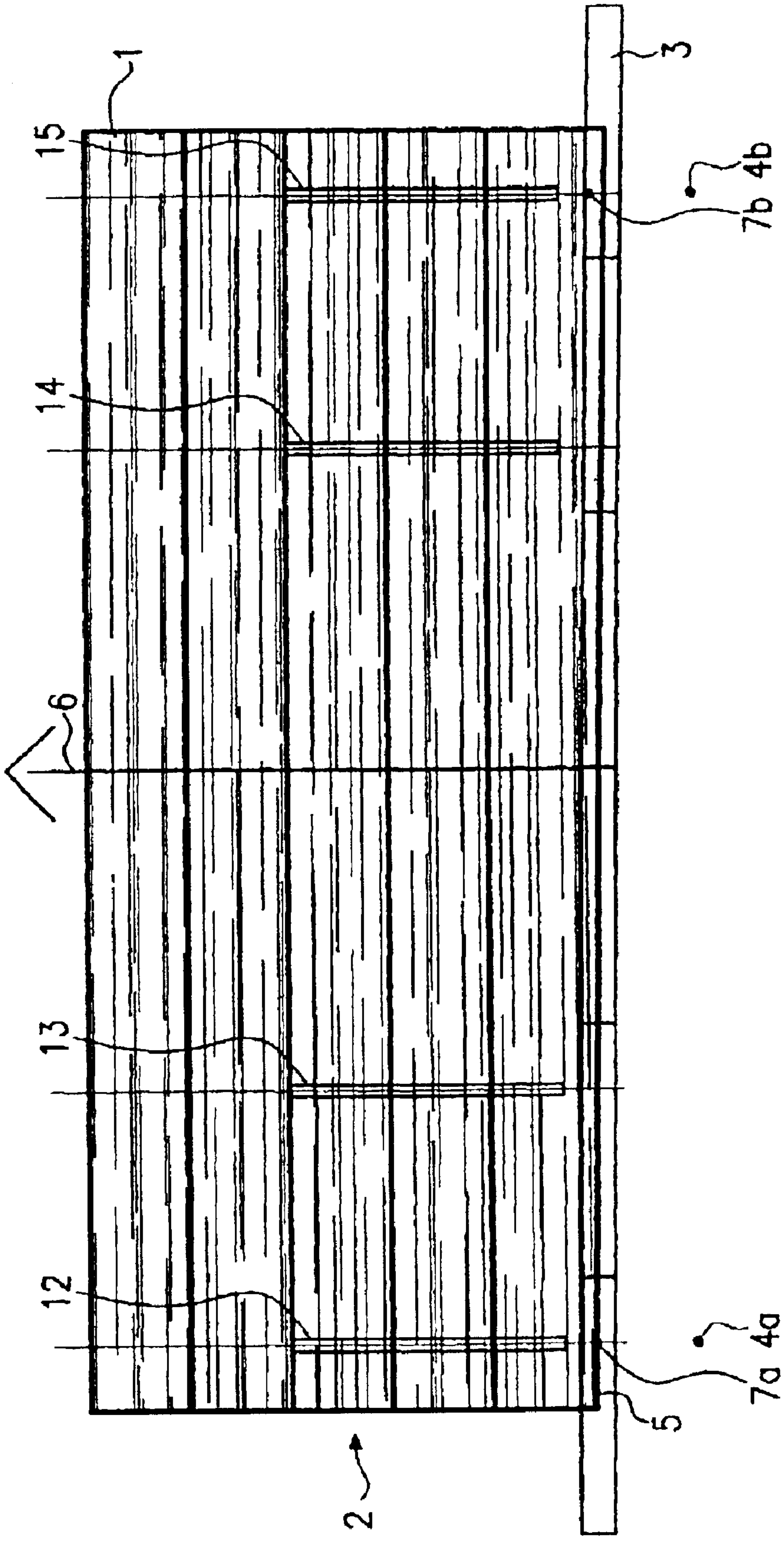

FIGS. 15 to 17 show the sequence of aligning a veneer carpet in parallel with the heating zone. It is here assumed that the rear edge 5*a* is obliquely oriented relative to the transportation direction 6 in a way similar to FIG. 5.

At a point of time Ta (FIG. 16), the transportation movement is started. Each of the light barriers 4*a*, 4*b*, 7*a* and 7*b* is occupied, i.e. covered by the veneer strip 1. At a point of time Tb, the light barrier 4*a* detects the rear edge 5 of the veneer strip 1. At a point of time Tc, the light barrier 4*b* detects the rear edge 5 of the veneer strip 1. At this point, the positioning process is started. At a point of time Td (FIG. 17), the positioning operation is completed. The rear edge 5 of the veneer is oriented in parallel with the centerline of the heating zone 3; the light barriers 7*a* and 7*b* detect the rear edge 5.

The areas A1 and A2 as shown in FIG. 15 correspond to the distances covered by the right and left transportation belts.

The invention is not limited to the illustrated embodiments; rather many alterations and modifications are possible within the scope of the present invention.

To sum up, the following should be noted:

The present invention relates to a method and an apparatus for the transverse gluing of veneer strips 1 to obtain a butt-glued veneer carpet 2. According to the invention a first sensor unit 4 and a second sensor unit 7 are provided for aligning a front edge and a rear edge 5, respectively, of a veneer strip 1 and of the veneer carpet 2, respectively, by means of a plurality of transportation belts 8 to 11 and 12 to 17, respectively, in such a manner that said edge is exactly positioned in a center line of a heating zone 3.

What is claimed is:

1. A method for transversely gluing veneer strips to obtain a butt-glued veneer carpet comprising:

transporting individual veneer strips along a transportation path having a transportation direction to a heating zone to be glued using a plurality of independently operable transportation members which are arranged to extend side by side in the transportation direction, determining orientation of an edge of one of the veneer strips being transported in a direction transverse to the transportation direction at a plurality of measuring points by using a first sensor unit that includes a plurality of sensors arranged in a direction transverse to the transportation direction, one of the transportation members being independently operable in response to a determined value of one of the sensors that is assigned to the one of the transportation members based on relative transverse positions of the one of the sensors and the one of the transportation members relative to the transportation direction, calculating a desired orientation of the edge of the one of the veneer strips in an area of the heating zone based on values determined by the sensors of the first sensor unit, and independently adjusting time/path functions of at least one of the transportation members as needed to change the orientation of the edge of the veneer strip based on the orientation of the edge of the one of the veneer strips as determined by the sensors of the first sensor unit.

2. The method according to claim 1, wherein the orientation of the edge of the one of the veneer strips is further determined by using a second sensor unit in the area of the heating zone.

3. The method according to claim 2, wherein a distortion of the edge of the one of the veneer strips is determined by using at least one of the first and second sensor units, and the plurality of the transportation members are operated separately for a straight alignment of the veneer strip.

4. The method according to claim 3, wherein areas of the veneer strips are clamped for the straight alignment of the veneer strips.

5. The method according to claim 1, wherein the edge of the one of the veneer strips is positioned in parallel with the heating zone arranged at a right angle relative to the transportation direction.

6. The method according to claim 1, wherein the veneer strips are reversingly movable in the transportation direction behind the heating zone.

7. An apparatus for transversely gluing veneer strips to obtain a butt-glued veneer carpet, comprising:

a first transportation mechanism arranged to supply a plurality of veneer strips in a transportation direction;

a first sensor unit disposed in an area of the first transportation mechanism;

a heating zone arranged in a direction transverse to the transportation direction;

a second sensor unit arranged in an area of the heating zone;

a second transportation mechanism arranged downstream of the heating zone; and a control and adjustment unit operatively coupled to at least one of the first and second transportation mechanisms and to at least one of the first and second sensor units to adjust orientations of the veneer strips, the second transportation mechanism comprising a plurality of separately operable transportation belts which are arranged to extend side by side in the transportation direction, at least one of the first and second transportation mechanisms having assigned thereto an upper counter-pressure device arranged to contact surfaces of the veneer strips, the counter-pressure device comprising ball elements or spherical rollers.

8. An apparatus for transversely gluing veneer strips to obtain a butt-glued veneer carpet, comprising:

a first transportation mechanism arranged to supply a plurality of veneer strips in a transportation direction;

a first sensor unit including a plurality of first sensors arranged transversely to the transportation direction;

a heating zone arranged in a direction transverse to the transportation direction;

a second transportation mechanism arranged downstream of the heating zone; and a control and adjustment unit operatively coupled to at least one of the first and second transportation mechanisms and to the first sensor unit to adjust orientations of the veneer strips, at least one of the first and second transportation mechanisms including a plurality of transportation members that are independently operable by the control and adjustment unit to adjust orientation of one of the veneer strips in response to a value determined by one of the first sensors that is assigned to a selected one of the transportation members based on relative transverse positions of the one of the first sensors and the one of the transportation members relative to the transportation direction.

9. The apparatus according to claim 8, wherein the first transportation mechanism comprises a plurality of separately operable transportation belts which are arranged to extend side by side in the transportation direction.

10. The apparatus according to claim 8, wherein the second transportation mechanism comprises a plurality of separately operable transportation belts which are arranged to extend side by side in the transportation direction.

11. The apparatus according to claim 10, wherein at least one of the first and second transportation mechanisms has assigned thereto an upper counter-pressure device arranged to contact surfaces of the veneer strips.

12. The apparatus according to claim 8, wherein the first sensors the first sensor unit comprise a plurality of optical sensors.

13. The apparatus according to claim 12, wherein the optical sensors are respectively arranged in a row transverse to the transportation direction.

14. The apparatus according to claim 8, wherein the first and second transportation mechanisms are operable in the transportation direction and at least one of the first and second transportation mechanisms is operable in a direction opposite to the transportation direction.

15. The apparatus according to claim 8, wherein the heating zone comprises upper and lower pressure elements.

16. The apparatus according to claim 8, further comprising a second sensor unit including a plurality of second sensors arranged transversely to the transportation direction in an area of the heating zone and operatively coupled to at least one of the first and second transportation mechanisms and to the control and adjustment unit that adjusts the orientation of one of the veneer strips in response to determined values of the second sensors.

17. The apparatus according to claim 16, wherein the second sensors of the second sensor unit are assigned to selected ones of the transportation members.

18. The apparatus according to claim 17, wherein both of the first and second transportation mechanisms include a plurality of the transportation members that are independently operable by the control and adjustment unit to adjust the orientation of one of the veneer strips.

19. The apparatus according to claim 18, wherein the transportation members of the first and second transportation mechanisms are operable in the transportation direction and at least one of the first and second transportation mechanisms is operable in a direction opposite to the transportation direction.

* * * * *